US011874323B2

(12) United States Patent
Wang

(10) Patent No.: US 11,874,323 B2
(45) Date of Patent: Jan. 16, 2024

(54) JTAG-BASED BURNING DEVICE

(71) Applicant: Inspur Suzhou Intelligent Technology Co., Ltd., Suzhou (CN)

(72) Inventor: Peng Wang, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 138 days.

(21) Appl. No.: 17/615,522

(22) PCT Filed: Sep. 27, 2019

(86) PCT No.: PCT/CN2019/108475
§ 371 (c)(1),
(2) Date: Nov. 30, 2021

(87) PCT Pub. No.: WO2021/056401
PCT Pub. Date: Apr. 1, 2021

(65) Prior Publication Data
US 2022/0317178 A1    Oct. 6, 2022

(30) Foreign Application Priority Data

Sep. 25, 2019    (CN) .......................... 201910912881.7

(51) Int. Cl.
*G01R 31/28*    (2006.01)
*G06F 30/30*    (2020.01)
(Continued)

(52) U.S. Cl.
CPC ......... *G01R 31/2855* (2013.01); *G06F 30/30* (2020.01); *G06F 9/445* (2013.01);
(Continued)

(58) Field of Classification Search
CPC ........ G06F 30/30; G06F 30/33; G06F 30/333; G06F 9/445; G06F 9/48; G06F 11/008;
(Continued)

(56) References Cited

U.S. PATENT DOCUMENTS 7,265,578 B1    9/2007 Tang
7,711,993 B2    5/2010 Duron
(Continued)

FOREIGN PATENT DOCUMENTS

CA    2291682 C  * 11/2004  ..... G01R 31/318533
CN    1763556 A  *  4/2006
(Continued)

OTHER PUBLICATIONS

Nagoya, WO Patent Document No. WO-9855926-A1, published Dec. 10, 1998, abstract and 1 drawing. (Year: 1998).*
(Continued)

*Primary Examiner* — Phallaka Kik
(74) *Attorney, Agent, or Firm* — David R. Stevens; Stevens Law Group

(57) ABSTRACT

Disclosed is a JTAG-based burning device, including controllable switches arranged between a TDI terminal of a JTAG host and a first chip, and between two adjacent chips, and further including a master controllable switch module arranged between each chip and a TDO terminal of the JTAG host, wherein the JTAG host may, according to a received burning instruction, control corresponding input terminals of the controllable switches to be connected to corresponding output terminals and also control an output terminal of the master controllable switch module to be connected to the corresponding input terminal. Obviously, a JTAG chain can be automatically adjusted by controlling the connection relationship between input and output terminals of the corresponding switches by only building a circuit, so that firmware burning on different chips or chip combinations is realized without manual adjustment, thereby improving the test efficiency, and simplifying the circuit structure.

20 Claims, 2 Drawing Sheets

(51) Int. Cl.
*G06F 11/27* (2006.01)
*G06F 30/33* (2020.01)
*G06F 11/273* (2006.01)
*G06F 11/25* (2006.01)
*G06F 11/08* (2006.01)
*G06F 9/445* (2018.01)
*G06F 30/333* (2020.01)
*G06F 9/48* (2006.01)
*G06F 11/00* (2006.01)

(52) U.S. Cl.
CPC .............. *G06F 9/48* (2013.01); *G06F 11/008* (2013.01); *G06F 11/25* (2013.01); *G06F 11/27* (2013.01); *G06F 11/273* (2013.01); *G06F 11/2733* (2013.01); *G06F 30/33* (2020.01); *G06F 30/333* (2020.01)

(58) Field of Classification Search
CPC ........ G06F 11/25; G06F 11/27; G06F 11/273; G06F 11/2733; G01R 31/2855
USPC ..... 716/136, 111, 106; 703/15; 714/30, 726, 714/733, 742; 713/1, 2, 100
See application file for complete search history.

(56) References Cited

U.S. PATENT DOCUMENTS

| | | | | |
|---|---|---|---|---|
| 2008/0147976 | A1* | 6/2008 | Bienek | G06F 12/0846 711/E12.024 |
| 2011/0314514 | A1* | 12/2011 | Goyal | G01R 31/318572 714/E11.155 |
| 2016/0314283 | A1* | 10/2016 | Basse | G06F 21/10 |
| 2017/0102431 | A1* | 4/2017 | Kukreja | G01R 31/318594 |

FOREIGN PATENT DOCUMENTS

| | | | | |
|---|---|---|---|---|
| CN | 1763556 | A | 4/2006 | |
| CN | 1948984 | | 4/2007 | |
| CN | 1948984 | A * | 4/2007 | |
| CN | 101118274 | | 2/2008 | |
| CN | 101266548 | | 9/2008 | |
| CN | 102998614 | | 3/2013 | |
| CN | 102998614 | A * | 3/2013 | |
| CN | 104461796 | | 3/2015 | |
| CN | 105548863 | | 5/2016 | |
| CN | 105550119 | | 5/2016 | |
| CN | 106326058 | | 1/2017 | |
| CN | 106597265 | A * | 4/2017 | ..... G01R 31/318536 |
| CN | 107122304 | | 9/2017 | |
| CN | 107122304 | A * | 9/2017 | .......... G06F 11/3656 |
| CN | 207074435 | | 3/2018 | |
| CN | 207182262 | | 4/2018 | |
| CN | 105550119 | B * | 6/2018 | ............... G06F 8/65 |
| CN | 209043946 | | 6/2019 | |
| WO | WO-2016202011 | A * | 12/2016 | |

OTHER PUBLICATIONS

Liao et al., Chinese Patent Document No. CN-100529785-C, published Aug. 19, 2009, front page. (Year: 2009).*
Li et al., Chinese Patent Document No. CN-106597265-B, published Apr. 26, 2017, abstract and 1 drawing. (Year: 2017).*
Zhao et al., Chinese Patent Document No. CN-100365423-C, published Jan. 30, 2008, front page. (Year: 2008).*
Chen et al., Chinese Patent Document No. CN-108228221-A, published Jun. 29, 2018, 3 pages, including 1 drawing. (Year: 2018).*
Nagoya, WO Patent Document No. WO-9855927-A1, published Dec. 10, 1998, 4 pages, including 1 drawing. (Year: 1998).*
Deng, Chinese Patent No. CN-108646172-A, published Oct. 12, 2018, 3 pages including 1 drawing. (Year: 2018).*
Search Report and Written Opinion, PCT/CN2019/108475, dated Jun. 24, 2020.
Chinese Office Action, Application No. 201910912881.7.

* cited by examiner

JTAG-BASED BURNING DEVICE

CROSS REFERENCE TO RELATED APPLICATIONS

The present application claims priority to Chinese Patent Application No. 201910912881.7 filed on Sep. 25, 2019 and entitled "JTAG-based burning device", the entire contents of which are incorporated herein by reference.

TECHNICAL FIELD

The present disclosure relates to the technical field of JTAG, and more particularly, relates to a JTAG-based burning device.

BACKGROUND

JTAG (Joint Test Action Group) is an international standard test protocol, and is mainly used for internal chip testing. At present, most advanced devices such as DSP and FPGA, support the JTAG protocol. A standard JTAG interface has 4 wires: TMS, TCK, TDI and TDO, which correspond to mode selection, clock, data input and data output lines respectively.

JTAG is originally used to test a chip, and the basic principle thereof is to define a TAP (Test Access Port) inside a device and test internal nodes through a specialized JTAG test tool. JTAG test allows multiple devices to be connected in series through the JTAG interface, that is, TDO of a previous JTAG device is connected to a TDI of a next JTAG device to form a JTAG chain, so that the devices are tested separately.

Nowadays, JTAG can also be used to perform firmware burning on the chip. Specifically, multiple JTAG devices are connected in series to form a JTAG chain, and a JTAG host such as a BMC (Baseboard Manager Controller) performs firmware burning on chips (Integrated Circuits) such as CPLD and FPGA through the JTAG chain. However, some chips do not support the serial firmware burning, a JTAG function needs to be used in the case of a separate connection with the JTAG host, so that multiple circuits need to be built when multiple chips are burned, thereby reducing the test efficiency and increasing circuit complexity.

SUMMARY

An objective of the present disclosure is to provide a JTAG-based burning device without manual adjustment, which improves the test efficiency and simplifies the circuit structure.

In order to solve the above technical problem, the present disclosure provides a JTAG-based burning device, including a JTAG host, N chips, a master controllable switch module and N controllable switches; wherein an input terminal of a first controllable switch is connected to a TDI terminal of the JTAG host, a first output terminal is connected to a TDI terminal of a first chip, and a second output terminal is connected to TDI terminals of ith to Nth chips respectively; an input terminal of an ith controllable switch is connected to a TDO terminal of an i−1th chip, the first output terminal is connected to an i−1th input terminal of the master controllable switch module, and the second output terminal is connected to the TDI terminal of the ith chip; an output terminal of the Nth chip is connected to an Nth input terminal of the master controllable switch module, an output terminal of the master controllable switch module is connected to a TDO terminal of the JTAG host, $2 \leq i \leq N$; and the JTAG host is also connected to control terminals of the N controllable switches and a control terminal of the master controllable switch module respectively, and used to, according to a burning instruction, control the input terminals of the corresponding controllable switches to be connected to corresponding output terminals and control the output terminal of the master controllable switch module to be connected to a corresponding input terminal.

Preferably, the master controllable switch module includes a master controllable switch; and a control terminal of the first controllable switch, a control terminal of the second controllable switch, . . . a control terminal of the Nth controllable switch and a control terminal of the master controllable switch are respectively connected to N+1 switch control terminals of the JTAG host in a one-to-one corresponding manner.

Preferably, the control terminal of the first controllable switch, the control terminal of the second controllable switch, . . . the control terminal of the Nth controllable switch are respectively connected to N switch control terminals of the JTAG host;

the master controllable switch module includes:

a master controllable switch, including N input terminals and an output terminal; and a conversion module, having an input terminal connected to the N switch control terminals of the JTAG host respectively and an output terminal connected to a control terminal of the master controllable switch, and used to, according to a control level output by the JTAG host, generate a corresponding control instruction to control an output terminal of the master controllable switch to be connected to a corresponding input terminal.

Preferably, N=2, and the conversion module is a logic gate.

Preferably, the first controllable switch and the second controllable switch are used to have the input terminals connected to the first output terminal when receiving a high level and have the input terminals connected to the second output terminal when receiving a low level;

the master controllable switch is used to have the output terminal connected to a second input terminal when receiving a high level, and have the output terminal connected to a first input terminal when receiving a low level; and the logic gate is an XNOR gate.

Preferably, the first controllable switch, the second controllable switch and the master controllable switch are single-pole double-throw switches.

Preferably, a distance between the first controllable switch and the second chip is less than 500 mil.

Preferably, a distance between the second controllable switch and the second chip is less than 500 mil.

Preferably, the distance between the first controllable switch and the second chip is less than 500 mil, and the distance between the second controllable switch and the second chip is less than 500 mil.

Preferably, the JTAG-based burning device further includes a reminder module; and the JTAG host is further used to generate and send information of a to-be-burned chip to the reminder module according to the burning instruction.

The JTAG-based burning device provided by the present disclosure includes the controllable switches arranged between the TDI terminal of the JTAG host and the first chip, and between the two adjacent chips, and further includes the master controllable switch module arranged between each chip and the TDO terminal of the JTAG host, wherein the JTAG host may, according to the received burning instruction, control the corresponding input terminals of the controllable switches to be connected to the corresponding output terminals, and also control the output terminal of the master controllable switch module to be connected to the corresponding input terminal. Obviously, a JTAG chain can be automatically adjusted by controlling the connection relationship between input and output terminals of the corresponding switches by only building a circuit, so that firmware burning on different chips or chip combinations is realized without manual adjustment, thereby improving the test efficiency, and simplifying the circuit structure.

BRIEF DESCRIPTION OF THE DRAWINGS

In order to illustrate the embodiments of the present disclosure or the technical solutions more clearly in the prior art, the accompanying drawings required to be used in the description of the embodiments or the prior art will be briefly described below. Obviously, the accompanying drawings in the following description are only some embodiments of the present disclosure, and those of ordinary skill in the art may also obtain other accompanying drawings according to these accompanying drawings without creative work.

DETAILED DESCRIPTION

The core of the present disclosure is to provide a JTAG-based burning device without manual adjustment, which improves the test efficiency and simplifies the circuit structure.

In order to make the objectives, technical solutions, and advantages of embodiments of the present disclosure clearer, the technical solutions in the embodiments of the present disclosure will be described clearly and completely in conjunction with the accompanying drawings in the embodiments of the present disclosure. Obviously, the described embodiments are part of the embodiments of the present disclosure but not all of the embodiments. Based on the embodiments of the present disclosure, all other embodiments obtained by those of ordinary skill in the art without creative work shall fall within the protective scope of the present disclosure.

Figure 1:
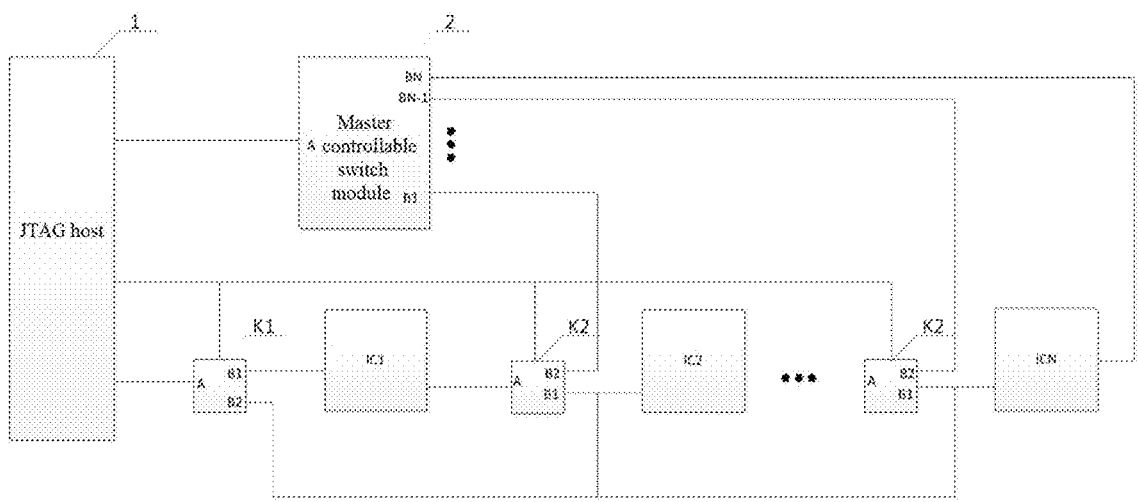
FIG. 1 is a schematic structural diagram of a JTAG-based burning device provided by the present disclosure.

Please refer to FIG. 1 which is a schematic structural diagram of a JTAG-based burning device provided by the present disclosure, the burning device includes a JTAG host 1, N chips, a master controllable switch module 2 and N controllable switches; wherein an input terminal of a first controllable switch K1 is connected to a TDI terminal of the JTAG host 1, a first output terminal is connected to a TDI terminal of a first chip IC1, and a second output terminal is connected to TDI terminals of ith to Nth chips respectively; an input terminal of an ith controllable switch is connected to a TDO terminal of an i−1th chip, the first output terminal is connected to an i−1th input terminal of the master controllable switch module 2, and the second output terminal is connected to the TDI terminal of the ith chip; an output terminal of the Nth chip is connected to an Nth input terminal of the master controllable switch module 2, an output terminal of the master controllable switch module 2 is connected to a TDO terminal of the JTAG host, 2≤i≤N; and the JTAG host 1 is also connected to control terminals of the N controllable switches and a control terminal of the master controllable switch module 2 respectively, and used to, according to a burning instruction, control the corresponding input terminals of the controllable switches to be connected to corresponding output terminals and control the output terminal of the master controllable switch module 2 to be connected to a corresponding input terminal.

In order to burn a plurality of chips, the chips that do not support serial firmware burning, the present differs from the prior art that the chips are connected to the JTAG host 1 separately in that only one main circuit is built, specifically, the controllable switches are respectively arranged between the TDI terminal of JTAG host 1 and the first chip IC1, and between two adjacent chips, the master total controllable switch module 2 is arranged between each chip and the TDO terminal of JTAG host 1, and furthermore, the output terminals of the controllable switches connected to the TDI terminal of the JTAG host 1 are not only connected to the TDI terminal of the first chip IC1, but also connected to the TDI terminals of other chips. The input terminal of each controllable switch is optionally connected to the output terminal thereof, and the input terminal of the master controllable switch module 2 is optionally connected to the output terminal thereof.

In the application, the user only needs to input the burning instruction, and the JTAG host 1 can, according to the burning instruction, control the corresponding input terminal of the controllable switch to be connected with the corresponding output terminal according to the programming instruction, and control the output terminal of the master controllable switch module 2 to be connected with corresponding input terminal. The burning instruction here may specifically include instructions for which chip or chips are to be burned. For example, the burning instruction here is an instruction to burn all chips that can be subjected to serial firmware burning, then the JTAG host 1 controls the corresponding input and output terminals of the respective controllable switches to be connected so that the to-be-burned chips are connected in series to form a JTAG chain, the JTAG host 1 also controls the input terminal of the master controllable switch module 2 connected to the output terminal of the last chip in the JTAG chain to be connected to the output terminal of the master controllable switch module 2, and subsequently, firmware burning on the JTAG chain by the JTAG host 1 can be implemented. In addition, the burning instruction here may also be an instruction to burn a single chip that does not support serial firmware burning, at the moment, the TAG host 1 controls the input terminal of the first controllable switch K1 to be connected to the output terminal connected to the to-be-burned chip and controls the input terminal of the controllable switch at a rear end of the to-be-burned chip to be connected to the output terminal connected to the master controllable switch module 2. The input terminal, connected to the to-be-burned chip by the controllable switch, of the master controllable switch module 2 is controlled to be connected to the output terminal, thereby enabling separate firmware burning on the to-be-burned chip by the JTAG host 1.

Figure 2:
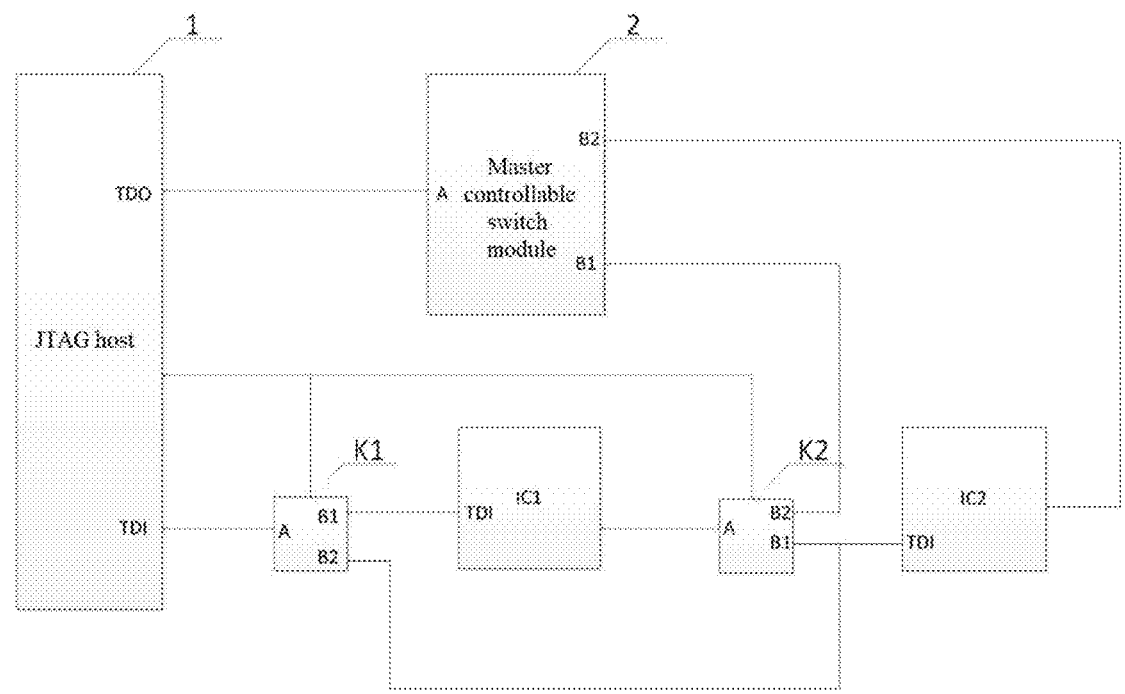
FIG. 2 is another schematic structural diagram of the JTAG-based burning device provided by the present disclosure.

The working principle of the present application will be introduced below in conjunction with FIG. 2. Please refer to FIG. 2, FIG. 2 is another schematic structural diagram of the JTAG-based burning device provided by the present disclosure.

Assuming that firmware burning is required for both a first chip IC1 and a second chip IC2, at the moment, the JTAG host 1 controls the input terminal A of the first controllable switch K1 to be connected to the first output terminal B1, also controls the input terminal A of the second controllable switch K2 to be connected to the first output terminal B1, and meanwhile, further controls the second input terminal B2 of the master controllable switch module 2 to be connected with the input terminal A. In this way, the JTAG host 1 can perform serial firmware burning on the first chip IC1 and the second chip IC2.

Assuming that the firmware burning is only required for the first chip IC1, at the moment, the JTAG host 1 controls the input terminal A of the first controllable switch K1 to be connected to the first output terminal B1, controls the input terminal A of the second controllable switch K2 to be connected to the second output terminal B2, controls a first input terminal B1 of a master controllable switch 21 to be connected to the output terminal A. In this way, the JTAG host 1 can perform firmware burning on the first chip IC1.

Assuming that the firmware burning is only required for the second chip IC2, at the moment, the JTAG host 1 controls the input terminal A of the first controllable switch K1 to be connected to the second output terminal B2, controls the input terminal of the second controllable switch K2 to be connected to the second output terminal B2 (to avoid that signals in the first chip IC1 are transferred to the second chip IC2 to interfere with burning on the second chip IC2), and controls a second input terminal B1 of the master controllable switch 21 to be connected to the output terminal A. In this way, the JTAG host 1 can perform firmware burning on the second chip IC2.

To sum up, the JTAG-based burning device provided by the present disclosure includes the controllable switches arranged between the TDI terminal of the JTAG host 1 and the first chip IC1, and between the two adjacent chips, and further includes the master controllable switch module 2 arranged between each chip and the TDO terminal of the JTAG host 1, wherein the JTAG host may, according to the received burning instruction, control the corresponding input terminals of the controllable switches to be connected to the corresponding output terminals and also control the output terminal of the master controllable switch module 2 to be connected to the corresponding input terminal. Obviously, by only building one circuit, the JTAG chain can be automatically adjusted by controlling the connection relationship between input and output terminals of the corresponding switches, and the switching of the JTAG line between a series topology and a parallel topology is achieved, so that firmware burning on different chips or chip combinations is realized without manual adjustment, thereby improving the test efficiency, and simplifying the circuit structure.

On the basis of the above embodiments.

As a preferred embodiment, the master controllable switch module 2 includes a master controllable switch 21; and a control terminal of the first controllable switch K1, a control terminal of the second controllable switch K2, . . . a control terminal of the Nth controllable switch KN and a control terminal of the master controllable switch 21 are respectively connected to N+1 switch control terminals of the JTAG host 1 in a one-to-one corresponding manner.

Specifically, the master controllable switch module 2 may only include one master controllable switch 21, the control terminal of the master controllable switch, the control terminal of the first controllable switch K1, the control terminal of the second controllable switch K2, . . . the control terminal of the Nth controllable switch KN are directly connected to the N+1 switch control terminals of the JTAG host 1, and at the moment, the JTAG host 1 directly controls the N controllable switches and the master controllable switch 21 without further conversion by other devices, thereby improving switch control reliability.

As a preferred embodiment, the control terminal of the first controllable switch K1, the control terminal of the second controllable switch K2, and the control terminal of the Nth controllable switch KN are respectively connected to the N switch control terminals of the JTAG host 1;

The master controllable switch module 2 includes:

a master controllable switch, including N input terminals and an output terminal;

a conversion module, having an input terminal connected to the N switch control terminals of the JTAG host 1 respectively and an output terminal connected to the control terminal of the master controllable switch 21, and used to, according to a control level output by the JTAG host, generate a corresponding control instruction to control the output terminal of the master controllable switch 21 to be connected to the corresponding input terminal.

It is not difficult to obtain which input terminal and output terminal of the master controllable switch 21 are logically related to the input terminal and output terminal of other controllable switches in terms of connection. Based on the logical relationship, the master controllable switch module 2 includes the conversion module besides the master controllable switch 21, wherein the input terminal of the conversion module is connected to the N switch control terminal of the JTAG host 1, the output terminal of the conversion module is connected to the control terminal of the master controllable switch 21, the conversion module is used to convert the control level output by the JTAG host 1 into the corresponding control instruction according to the logical relation, to control the output terminal of the master controllable switch 21 to be connected with the corresponding input terminal. Obviously, in this way, a pin of the JTAG host 1 simplifies the structure of the JTAG host 1.

As a preferred embodiment, N=2, and the conversion module is a logic gate.

In order to achieve a corresponding logical transition of each control level output by the JTAG host 1, in the embodiment, the conversion module here may be the logic gate which has the advantages of low cost and low power consumption, and certainly, the conversion module here may also be other types of conversion modules, which is not specifically limited in the present application.

As a preferred embodiment, the first controllable switch K1 and the second controllable switch K2 are used to have the input terminals connected to the first output terminal when receiving a high level and have the input terminals connected to the second output terminal when receiving a low level;

the master controllable switch 21 is used to have the output terminal connected to the second input terminal when receiving a high level, and have the output terminal connected to the first input terminal when receiving a low level; and the logic gate is an XNOR gate 22.

Figure 3:
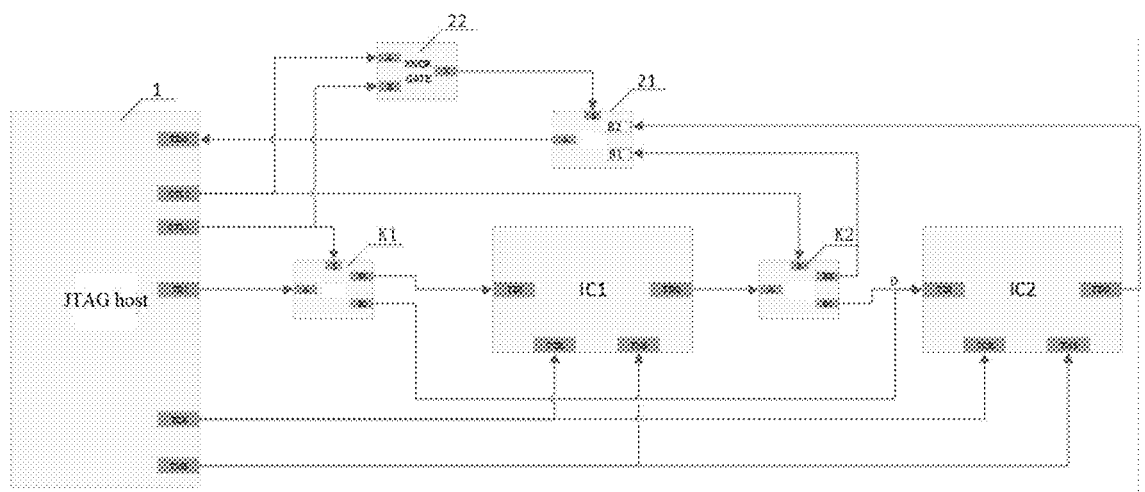
FIG. 3 is yet another schematic structural diagram of the JTAG-based burning device provided by the present disclosure.

Specifically, please refer to FIG. 3, and FIG. 3 is yet another schematic structural diagram of the JTAG-based burning device provided by the present disclosure.

In the embodiment, the logic gate is an XNOR gate 22, and the truth table of the XNOR gate 22 is as follows:

| A | B | Y |
|---|---|---|
| 0 | 0 | 1 |
| 0 | 1 | 0 |
| 1 | 0 | 0 |
| 1 | 1 | 1 |

It is not difficult to obtain that the JTAG host 1 outputs a high level to the first controllable switch K1 and the second controllable switch K2 respectively, so that when the first chip IC1 and second chip IC2 are connected in series, two input terminals of the XNOR gate are in the high level, and the high level is output, and the output terminal A of the master controllable switch 21 is connected to the second input terminal B2, so that the serial firmware burning on the first chip IC1 and the second chip IC2 by the JTAG host 1 is achieved.

When the JTAG host 1 outputs a high level to the first controllable switch K1 and outputs a low level to the second controllable switch K2 to perform firmware burning only on the first chip IC1, one of the two input terminals of the XNOR gate is in the high level and the other one of the two input terminals is in the low level, the low level is output, and the output terminal A of the master controllable switch 21 is connected to the first input terminal B1, so that the serial firmware burning only on the first chip IC1 by the JTAG host 1 is achieved. At the moment, the output terminal of the second chip IC2 and the second input terminal B2 of the master controllable switch 21 are in a communication state. However, the connection between the JTAG host 1 and the first chip IC1 is not affected due to the isolation of the master controllable switch 21.

When the JTAG host 1 outputs a low level to the first controllable switch K1 and outputs a low level to the second controllable switch K2 to perform firmware burning only on the second chip IC2, the two input terminals of the XNOR gate are in the low level, a high level is output, and the output terminal A of the master controllable switch 21 is connected to the first input terminal B1, so that the serial firmware burning only on the second chip IC2 by the JTAG host 1 is achieved. At the moment, the output terminal of the first chip IC1 and the first input terminal B1 of the master controllable switch 21 are in a communication state. However, the connection between the JTAG host 1 and the second chip IC2 is not affected due to the isolation of the master controllable switch 21.

Obviously, in this way, the burning of the chips can be controlled, and the control manner is simple and reliable.

As a preferred embodiment, the first controllable switch K1, the second controllable switch K2 and the master controllable switch 21 are single-pole double-throw switches.

Specifically, the first controllable switch K1, the second controllable switch K2 and the master controllable switch 21 herein are single-pole double-throw switches which have the advantages of simple structure and high reliability. Of course, the first controllable switch K1, the second controllable switch K2 and the master controllable switch 21 herein may also be other types of switches, which are specifically limited in the present application.

As a preferred embodiment, a distance between the first controllable switch K1 and the second chip IC2 is less than 500 mil.

As a preferred embodiment, a distance between the second controllable switch K2 and the second chip IC2 is less than 500 mil.

As a preferred embodiment, the distance between the first controllable switch K1 and the second chip IC2 is less than 500 mil, and the distance between the second controllable switch K2 and the second chip IC2 is less than 500 mil.

Specifically, due to the consideration that the burning device may generate a stub signal in the working process, which affects the TDI/TDO signal quality, please refer to FIG. 2, for example when the serial firmware burning is performed on the first chip IC1 and the second chip IC2, a stub portion is between a point D and the second output terminal B2 of the first controllable switch K1; when the firmware burning is only performed on the first chip IC1, no stub portion is present in the line; and when firmware burning is only performed on the second chip IC2, a stub portion is from the first output terminal B1 of the second controllable switch K2 to the point D.

In order to minimize the influence of stub on the TDI/TDO signal quality, the layout should be designed according to the following principles: the second controllable switch K2 is arranged close to the second chip IC2 and the first controllable switch K1 is arranged close to the second chip IC2. Based on this, in the embodiment, it has found through a large number of simulation experiments that when the distance between the first controllable switch K1 and the second chip IC2 is less than 500 mil, and/or the distance between the second controllable switch K2 and the second chip IC2 is less than 500 mil, the stub has less influence on the TDI/TDO signal quality. In the embodiment, the specific distance between the first controllable switch K1 and the second chip IC2 and the specific distance between the second controllable switch K2 and the second chip IC2 are not specifically limited, and are determined according to actual conditions.

Obviously, In this way, the influence of stub on the TDI/TDO signal quality can be effectively reduced, and the TDI/TDO signal transmission quality can be improved.

As a preferred embodiment, the burning device further includes a reminder module; and the JTAG host 1 is further used to generate and send information of a to-be-burned chip to the reminder module according to the burning instruction.

Specifically, in order to facilitate the user's understanding of the current information about the to-be-burned chip, such as a serial number of the to-be-burned chip, the burning apparatus in the embodiment further includes the reminder module used to remind the generation of the information about the to-be-burned chip according to the burning instruction, thereby improving the user experience.

The reminder module may be, but not limited to a display screen herein.

It should be noted that in the description, relational terms such as first and second are used only to distinguish one entity or operation from another entity or operation without necessarily requiring or implying any actual such relationship or order between these entities or operations. Furthermore, the terms "include", "comprise" or any other variation thereof, are intended to cover a non-exclusive inclusion, such that a process, method, article, or device that includes a series of elements not only includes those elements but also includes other elements not expressly listed or also includes inherent elements of such process, method, article, or device. In the case of no more restrictions, the element defined by the sentence "including a . . . " does not exclude the existence of other identical elements in the process, method, article, or device including the element.

The above description of the disclosed embodiments enables those skilled in the art to implement or use the present disclosure. Various modifications to these embodiments will be readily apparent to those skilled in the art, and the general principle defined herein may be implemented in other embodiments without departing from the spirit or scope of the present disclosure. Thus, the present disclosure is not intended to be limited to the embodiments shown herein but is to be accorded with the widest scope consistent with the principles and novel features disclosed herein.

What is claimed is:

1. A JTAG-based burning device, comprising a JTAG host, N chips, a master controllable switch module and N controllable switches; wherein
    an input terminal of a first controllable switch is connected to a TDI terminal of the JTAG host, a first output terminal is connected to a TDI terminal of a first chip, and a second output terminal is connected to TDI terminals of ith to Nth chips respectively; an input terminal of an ith controllable switch is connected to a TDO terminal of an i-1th chip, the first output terminal is connected to an i-1th input terminal of the master controllable switch module, and the second output terminal is connected to the TDI terminal of the ith chip; an output terminal of the Nth chip is connected to an Nth input terminal of the master controllable switch module, an output terminal of the master controllable switch module is connected to a TDO terminal of the JTAG host, $2 \leq i \leq N$;
    the JTAG host is also connected to control terminals of the N controllable switches and a control terminal of the master controllable switch module respectively, and used to, according to a burning instruction, control the corresponding input terminals of the controllable switches to be connected to corresponding output terminals and control the output terminal of the master controllable switch module to be connected to a corresponding input terminal.

2. The JTAG-based burning device according to claim 1, wherein the master controllable switch module comprises a master controllable switch; and
    a control terminal of the first controllable switch, a control terminal of the second controllable switch, . . . a control terminal of the Nth controllable switch and a control terminal of the master controllable switch are respectively connected to N+1 switch control terminals of the JTAG host in a one-to-one corresponding manner.

3. The JTAG-based burning device according to claim 2, wherein a distance between the first controllable switch and the second chip is less than 500 mil.

4. The JTAG-based burning device according to claim 2, wherein a distance between the second controllable switch and the second chip is less than 500 mil.

5. The JTAG-based burning device according to claim 2, wherein the distance between the first controllable switch and the second chip is less than 500 mil, and the distance between the second controllable switch and the second chip is less than 500 mil.

6. The JTAG-based burning device according to claim 1, wherein the control terminal of the first controllable switch, the control terminal of the second controllable switch, . . . the control terminal of the Nth controllable switch are respectively connected to NV switch control terminals of the JTAG host;
    the master controllable switch module comprises:
        a master controllable switch, comprising N input terminals and an output terminal;
        a conversion module, having an input terminal connected to the N switch control terminals of the JTAG host respectively and an output terminal connected to a control terminal of the master controllable switch, and used to, according to a control level output by the JTAG host, generate a corresponding control instruction to control the output terminal of the master controllable switch to be connected to a corresponding input terminal.

7. The JTAG-based burning device according to claim 6, wherein N=2, and the conversion module is a logic gate.

8. The JTAG-based burning device according to claim 7, wherein the first controllable switch and the second controllable switch are used to have the input terminals connected to the first output terminal when receiving a high level and have the input terminals connected to the second output terminal when receiving a low level;
    the master controllable switch is used to have the output terminal connected to a second input terminal when receiving a high level, and have the output terminal connected to a first input terminal when receiving a low level; and
    the logic gate is an XNOR gate.

9. The JTAG-based burning device according to claim 8, wherein a distance between the first controllable switch and the second chip is less than 500 mil.

10. The JTAG-based burning device according to claim 8, wherein a distance between the second controllable switch and the second chip is less than 500 mil.

11. The JTAG-based burning device according to claim 7, wherein the first controllable switch, the second controllable switch and the master controllable switch are single-pole double-throw switches.

12. The JTAG-based burning device according to claim 11, wherein a distance between the first controllable switch and the second chip is less than 500 mil.

13. The JTAG-based burning device according to claim 11, wherein a distance between the second controllable switch and the second chip is less than 500 mil.

14. The JTAG-based burning device according to claim 7, wherein a distance between the first controllable switch and the second chip is less than 500 mil.

15. The JTAG-based burning device according to claim 7, wherein a distance between the second controllable switch and the second chip is less than 500 mil.

16. The JTAG-based burning device according to claim 7, wherein the distance between the first controllable switch and the second chip is less than 500 mil, and the distance between the second controllable switch and the second chip is less than 500 mil.

17. The JTAG-based burning device according to claim 6, wherein a distance between the first controllable switch and the second chip is less than 500 mil.

18. The JTAG-based burning device according to claim 6, wherein a distance between the second controllable switch and the second chip is less than 500 mil.

19. The JTAG-based burning device according to claim 6, wherein the distance between the first controllable switch and the second chip is less than 500 mil, and the distance between the second controllable switch and the second chip is less than 500 mil.

20. The JTAG-based burning device according to claim 1, further comprising a reminder module; and
the JTAG host further used to generate and send information of a to-be-burned chip to the reminder module according to the burning instruction.

\* \* \* \* \*